United States Patent
Lee (10) Patent No.: US 8,638,458 B2
(45) Date of Patent: Jan. 28, 2014

(54) IMAGE FORMING APPARATUS AND METHOD TO RECEIVE PRINT DATA AT UNIQUE DATA SINK ADDRESS

(75) Inventor: Jong-Nam Lee, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 712 days.

(21) Appl. No.: 12/659,944

(22) Filed: Mar. 25, 2010

(65) Prior Publication Data

US 2011/0051171 A1    Mar. 3, 2011

(30) Foreign Application Priority Data

Aug. 28, 2009  (KR) .............. 2009-0080705

(51) Int. Cl.
*G06F 3/12*    (2006.01)
*G06F 15/16*    (2006.01)

(52) U.S. Cl.
USPC ....... 358/1.15; 358/1.13; 358/1.14; 358/1.16; 709/203; 709/202; 709/227; 709/231

(58) Field of Classification Search
USPC ........ 358/1.13–1.15; 709/220, 202, 227, 231, 709/203
See application file for complete search history.

(56) References Cited

U.S. PATENT DOCUMENTS

| | | | | |
|---|---|---|---|---|
| 7,052,190 B2* | 5/2006 | Ishii | ............................... | 400/62 |
| 7,287,282 B2* | 10/2007 | Yamada et al. | ................. | 726/26 |
| 7,650,509 B1* | 1/2010 | Dunning | ....................... | 713/184 |
| 7,839,525 B2* | 11/2010 | Kim et al. | ..................... | 358/1.15 |
| 8,056,109 B2* | 11/2011 | Kim et al. | ..................... | 725/112 |
| 2003/0206311 A1* | 11/2003 | Konsella et al. | ............. | 358/1.14 |
| 2006/0022453 A1* | 2/2006 | Cosgrove | ..................... | 283/116 |
| 2006/0061813 A1* | 3/2006 | Kuroda et al. | ............... | 358/1.15 |
| 2006/0117084 A1* | 6/2006 | Morozumi et al. | ........... | 709/203 |
| 2006/0275065 A1* | 12/2006 | Bunsey et al. | .................. | 400/62 |
| 2007/0091364 A1 | 4/2007 | Kim et al. | | |
| 2008/0037783 A1* | 2/2008 | Kim et al. | ..................... | 380/241 |
| 2009/0086262 A1* | 4/2009 | Suzuki | ........................ | 358/1.15 |
| 2009/0086270 A1* | 4/2009 | Miyazawa | ................... | 358/1.15 |
| 2009/0094317 A1* | 4/2009 | Venkitaraman | ............... | 709/203 |

OTHER PUBLICATIONS

Extended European Search Report issued Nov. 22, 2012 in corresponding European Patent Application No. 10157991.0.
Shivaun Albright et al, "PrintBasic: 1 Service Template Version 1.01", Aug. 8, 2002, pp. 1-23.

* cited by examiner

*Primary Examiner* — Twyler Haskins
*Assistant Examiner* — Dennis Dicker
(74) *Attorney, Agent, or Firm* — Staas & Halsey LLP (57) ABSTRACT

An image forming apparatus is provided, which includes an image forming unit to output print data; a DLNA stack to create a job ID of a print job requested to be executed in response to a print job execution request received from a control point (CP) connected over the DLNA network, and to create a data sink address including a fixed portion and a variable portion to receive a print data of the print job, using the created job ID; a communication interface to transmit the created job ID and the created data sink address to the CP, and to receive print data corresponding to the data sink address from the CP; and a controller to assign the job ID to the received print data and to control the image forming unit to print the print data.

27 Claims, 5 Drawing Sheets

IMAGE FORMING APPARATUS AND METHOD TO RECEIVE PRINT DATA AT UNIQUE DATA SINK ADDRESS

CROSS-REFERENCE TO RELATED APPLICATIONS

This application claims the benefit of Korean Application No. 2009-80705, filed Aug. 28, 2009, in the Korean Intellectual Property Office, the disclosure of which is incorporated herein by reference.

BACKGROUND

1. Field

The embodiments generally relate to an image forming apparatus and method thereof, and more particularly, to an image forming apparatus to receive print data at a unique data sink address corresponding to a print job so that the print data may be easily distinguished and managed, and to an image forming method of the image forming apparatus.

2. Description of the Related Art

Image forming apparatuses generally print print data generated by terminal devices, such as computers, onto recording media. Examples of such image forming apparatuses include copiers, printers, facsimile machines or multifunction peripherals (MFPs), which combine functions of copiers, printers and facsimile machines in a single system.

Image forming apparatuses which have been widely used in recent years can receive print jobs not only using terminal devices, such as computers, but can also support digital living network alliance (DLNA) standards so as to receive print jobs using various DLNA apparatuses.

DLNA is a standardization organization for digital information technology products, which was established to set the standards so that data, such as music, photos or moving images, are compatible. DLNA aims at establishing a compatible platform based on open industry standards that have been already established, thereby realizing consistency between industries.

It is important for image forming apparatuses to accurately print received print data, and also to appropriately process status information of a print job corresponding to the print data and a print cancel command.

In the DLNA print standard, an operation to create a print job and an operation to transmit actual print data to a printer are separated, and accordingly there is a need for methods to manage and control job IDs of print jobs, which are created in response to a print job creation command, and print data received after the print jobs are created. However, a problem of the DLNA standard is that detailed standards for these required methods are not defined. For example, if print data is received in a different order from an order of IDs for created jobs while a DLNA printer performs a plurality of print jobs, the DLNA printer may not appropriately process status information of print jobs and the print cancel command.

SUMMARY

Accordingly, it is an aspect to provide an image forming apparatus to receive print data at a unique data sink address corresponding to a print job so that the print data may be easily distinguished and managed, and to an image forming method of the image forming apparatus.

Additional aspects and/or advantages will be set forth in part in the description which follows and, in part, will be apparent from the description, or may be learned by practice of the invention.

The foregoing and/or other aspects are achieved by providing an image forming apparatus, which is connected to a digital living network alliance (DLNA) network and performing a print job, including an image forming unit, a DLNA stack to create a job identification (ID) of a print job requested to be executed in response to a print job execution request received from a control point (CP) connected over the DLNA network, and to create a data sink address comprising a fixed portion and a variable portion to receive print data of the print job, using the created job ID, a communication interface to transmit the created job ID and the created data sink address to the CP, and to receive the print data corresponding to the data sink address from the CP, and a controller to assign the job ID to the received print data and to control the image forming unit to print the print data.

The DLNA stack may include an extraction unit to extract address information of the CP. The fixed portion of the data sink address may show a fixed address for the image forming apparatus, and the variable portion may show at least one of the job ID and unique information of the CP. The unique information of the CP may be at least one of an IP address and a media access control (MAC) address of the CP.

The image forming apparatus may further include a storage unit to store the job ID and the data sink address. When the print data is received, the controller may compare the job ID and the data sink address which are stored in the storage unit, and may assign a job ID to the received print data.

When a print status check request for the job ID is received from the CP, the controller may notify the CP of a print status of a print job having the job ID. When a print cancel command for the job ID is received from the CP, the controller may cancel printing of a print data of a print job having the job ID and may notify the CP of cancellation of the print job. When the print data output from the CP is completely printed, the controller may notify the CP of completion of printing. The image forming apparatus may further include a user interface to display the print status. The communication interface may encode the created job ID and the created data sink address using a preset password, and may transmit the encoded job ID and encoded data sink address.

The DLNA stack may include a job ID creator to create a unique job ID for the print job, and an address creator to create a data sink address having a unique variable portion for the print job.

The foregoing and/or other aspects are also achieved by providing an image forming method of an image forming apparatus, which is connected to a digital living network alliance (DLNA) network and performing a print job, the image forming method including receiving a print job execution request from a control point (CP) connected over the DLNA network; creating a job identification (ID) of a print job in response to the received print job execution request; creating a data sink address including a fixed portion and a variable portion, using the created job ID; transmitting the created job ID and the created data sink address to the CP; when print data corresponding to the data sink address is received from the CP, assigning the job ID to the received print data; and printing the print data.

The image forming method may further include extracting address information of the CP. The fixed portion of the data sink address may show a fixed address for the image forming apparatus, and the variable portion may show at least one of the job ID and unique information of the CP. The unique information of the CP may be at least one of an IP address and a MAC address of the CP.

The image forming method may further include storing the job ID and the data sink address. The assigning of the job ID may include, when the print data is received, comparing the stored job ID and the stored data sink address and assigning a job ID to the received print data.

The image forming method may further include, when a print status check request for the job ID is received from the CP, notifying the CP of a print status of a print job having the job ID.

The image forming method may further include, when a print cancel command for the job ID is received from the CP, cancelling printing of print data of a print job having the job ID and notifying the CP of cancellation of the print job.

The image forming method may further include, when the print data output from the CP is completely printed, notifying the CP of completion of printing.

The image forming method may further include displaying the print status on a user interface of the image forming apparatus.

The transmitting of the created job ID and the created data sink address may include encoding the created job ID and the created data sink address using a preset password, and transmitting the encoded job ID and encoded data sink address.

The creating of the job ID may include creating a unique job ID for the print job, and the creating of the data sink address may include creating a data sink address having a unique variable portion for the print job.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Reference will now be made in detail to the exemplary embodiments, examples of which are illustrated in the accompanying drawings, wherein like reference numerals refer to like elements throughout. The embodiments are described below in order to explain the aspects by referring to the figures.

Figure 1:
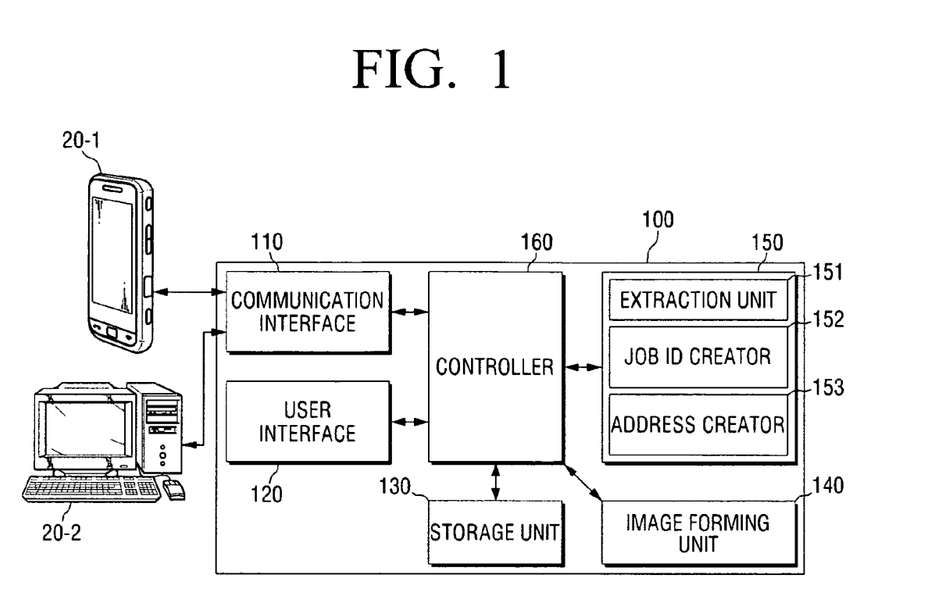
FIG. 1 is a block diagram illustrating a configuration of an image forming apparatus according to an exemplary embodiment.

FIG. 1 is a block diagram illustrating a configuration of an image forming apparatus 100 according to an exemplary embodiment. The image forming apparatus 100 of FIG. 1 includes a communication interface 110, a user interface 120, a storage unit 130, an image forming unit 140, a digital living network alliance (DLNA) stack 150 and a controller 160. Examples of the image forming apparatus 100 may include copiers, printers, facsimile machines or multifunction peripherals (MFPs) which combine functions of copiers, printers and facsimile machines in a single system.

The communication interface 110 may be connected to a DLNA network, to be connected to control points CPs 20-1, 20-2, . . . , 20-n via the DLNA network. For convenience of explanation, two CPs 20-1 and 20-2 are illustrated herein. Additionally, the communication interface 110 may receive a print job request for execution of a print job from the CPs 20-1, 20-2, . . . , 20-n connected to the DLNA network. The communication interface 110 may transmit a job ID and a data sink address which are created by the DLNA stack 150 (described later), to the CPs 20-1, 20-2, . . . , 20-n. Furthermore, the communication interface 110 may receive print data from the CPs 20-1, 20-2, . . . , 20-n. In this situation, the Universal Plug and Play (UPnP) standard is employed to enable the communication interface 110 to transmit or receive the job ID, data sink address and print data to or from the CPs 20-1, 20-2, . . . , 20-n. The communication interface 110 may support not only the DLNA network but also a local communication scheme, a local area network (LAN) and an Internet network.

The communication interface 110 may transmit the created job ID and data sink address to the CPs 20-1, 20-2, . . . , 20-n using a preset password. In more detail, the communication interface 110 may encode the job ID and data sink address created by the DLNA stack 150 using a password pre-stored in the storage unit 130 (for example, a public key/private key or a certificate), and may then transmit the encoded job ID and data sink address to the CPs 20-1, 20-2, . . . , 20-n which request execution of the print job. Additionally, the communication interface 110 may encode all kinds of data and requests which are capable of being transmitted between the CPs 20-1, 20-2, . . . , 20-n and the image forming apparatus 100, for example, a print job request, a print cancel command, or a print status check request, and may then transmit or receive the encoded data and requests to or from the CPs 20-1, 20-2, . . . , 20-n.

The user interface 120 includes a plurality of function keys through which a user is able to set or select various functions supported by the image forming apparatus 100. The user interface 120 may display a variety of information provided by the image forming apparatus 100, and a current status and a process result of a job which is currently being processed by the image forming apparatus 100. The user interface 120 may be implemented as an apparatus such as a touch pad, where both input and output can be implemented, or as an apparatus combining a mouse and a monitor. Accordingly, a user may check various print jobs in the image forming apparatus 100 through the user interface 120, and may manage and control the print jobs.

The storage unit 130 may store job IDs and data sink addresses created by the DLNA stack 150 in such a manner that the job IDs and data sink addresses correspond to each other. Additionally, the storage unit 130 may store received print data as print data of a print job having a job ID corresponding to a received data sink address. In more detail, a job ID and data sink address for a single print job which are created by the DLNA stack 150 may be stored in the form of a lookup table in the storage unit 130, and the print data received via the communication interface 110 may be stored as print data of a print job having a job ID corresponding to a received data sink address. Additionally, the storage unit 130 may be implemented as a storage medium built in the image forming apparatus 100, or as an external storage medium to be coupled to the image forming apparatus 100. For example, the storage unit 130 may be a removable disk including a universal serial bus (USB) memory, a storage medium connected to a host device, or a web server connected via a network, or any other suitable storage device.

The image forming unit 140 may output print data. In more detail, the image forming unit 140 may print the print data received via the communication interface 110 or the print data pre-stored in the storage unit 130.

If a request to print a print job is received from a CP connected over the DLNA network, the DLNA stack 150 may create a job ID for the print job, and may create a data sink address, which is to receive print data of the print job and includes a fixed portion and a variable portion, using the created job ID. The DLNA stack 150 may include an extraction unit 151, a job ID creator 152, and an address creator 153.

The extraction unit 151 may extract address information of a CP. In this situation, the address information may be information on an address for a CP which requests execution of a print job, for example, an IP address and a MAC address for the CP.

The job ID creator 152 creates a unique job ID for a print job. In more detail, if a request to execute a print job is received from a CP, the job ID creator 152 may create a unique job ID for the print job. For example, the job ID creator 152 may count the number of times to execute the print job, and may create a job ID using the counted value. Additionally, the job ID creator 152 may create a job ID based on a point of time at which the print job request is received. Furthermore, the job ID creator 152 may add the address information extracted by the extraction unit 151 to the counted value or the time, so as to create a job ID. Moreover, the job ID creator 152 may create a job ID in the same manner as a conventional DLNA printer. However, since a job ID created according to the UPnP standard needs to be represented by numerals between 1 and 232-1, the job ID creator 152 may set one of the numerals between 1 and 232-1 as a job ID.

The address creator 153 may create a 'data sink address at which print data of the print job is to be received' using the created job ID. More specifically, the address creator 153 may add the job ID created by the job ID creator 152 to an IP address for the image forming apparatus 100, to create a 'data sink address at which print data of the print job is to be received.' Additionally, the address creator 153 may combine the address information extracted by the extraction unit 151 with the job ID created by the job ID creator 152, to create a 'data sink address at which print data of the print job is to be received'. Herein, the 'data sink address at which print data of the print job is to be received' refers to a 'data sink URL' in the UPnP standard. The operations of the address creator 153 are described in detail with reference to FIG. 4.

Figure 4:
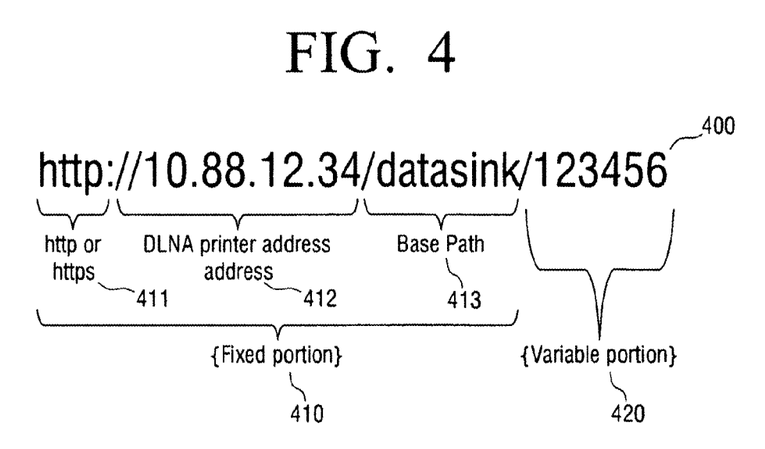
FIG. 4 is a view illustrating an example of a data sink address according to an exemplary embodiment.

FIG. 4 exemplarily illustrates a data sink address according to an exemplary embodiment.

In FIG. 4, a data sink URL 400 includes a fixed portion 410 and a variable portion 420. The fixed portion 410 defines an address which is commonly assigned to all print jobs, and accordingly may show a fixed address for the image forming apparatus 100. The variable portion 420 defines an address which is uniquely assigned to each print job, and accordingly may show at least one of a job ID and unique information for the CP. In more detail, the fixed portion 410 includes an 'http' 411, an image forming apparatus address 412, and a 'base path' 413. As illustrated herein, the 'base path' 413 represents an address used when the image forming apparatus 100 receives print data, and is previously set in manufacturing of products. Alternatively, the 'base path' 413 may be set to be variable in manufacturing of products, and in this case, the 'base path' 413 may be contained in the variable portion 420.

Since the variable portion 420 defines an address which is uniquely assigned to each print job as described above, a job ID may be represented in the variable portion 420. For example, if a job ID is '3', the address creator 153 may create an address 'http://10.88.12.31/datasink/3'. Alternatively, an IP address or MAC address for a CP may also be represented in the variable portion 420. For example, if a job ID is '3', and if an IP address is '10.88.1.0', the address creator 153 may combine the IP address and job ID, so as to create a data sink address 'http://10.88.12.31/datasink/310881231' or 'http://10.88.12.31/datasink/10881231/3'.

The controller 160 may control the created job ID and the created data sink address to be transferred to a CP. In more detail, if the DLNA stack 150 creates a job ID and a data sink address in response to the print job request, the controller 160 may control the communication interface 110 to transfer the created job ID and the created data sink address to a CP which sends the print job request to the image forming apparatus 100. In this situation, the control of the controller 160 may control the communication interface 110 to encode the job ID and data sink address, so that the encoded job ID and data sink address may be transmitted to the CP.

Additionally, the controller 160 may assign a job ID to the print data received at the created data sink address, and may control the image forming unit 140 to print the print data. More specifically, the CP may transmit print data to the created data sink address corresponding to the print job, and thus the controller 160 may recognize the print data received at the created data sink address as the print data of the job corresponding to the data sink address. In other words, the controller 160 may assign a job ID corresponding to the data sink address at which the print data is received, to the print data, and may control the image forming unit 140 so that the print job containing the print data to which the job ID is assigned may be performed.

In this situation, the controller 160 may determine in advance whether there is a job ID corresponding to the data sink address at which print data is received, while monitoring the lookup table in the storage unit 130. If it is determined that there is no job ID, the controller 160 may control the communication interface 110 to provide an error message to a CP which transmits the print data to the data sink address. This operation of the controller 160 may be performed when the CP starts transmitting the print data, and may be performed during transmission of the print data or performed immediately after the print data is completely received.

Furthermore, the controller 160 may control the received print data to be stored as print data of the print job having the job ID corresponding to the data sink address. In more detail, if another print job is currently performed, or if errors, such as paper empty, occur, the print data output from the CP may not be printed immediately after being received. Accordingly, the controller 160 may control the storage unit 130 to store the print data received via the communication interface 110 as print data of the print job having the job ID corresponding to the data sink address. For example, if a job ID and a data sink address which are provided to the CP are '12,' and 'http://10.88.12.31/datasink/12,' respectively, the controller 160 may recognize print data received at 'http://10.88.12.31/datasink/12' as print data corresponding to job ID 12. Additionally, if print data is sequentially stored in a job queue, and if corresponding print data is stored in a second region, the controller 160 may prepare a lookup table such as 'Job ID: 12, DataSink URL: http://10.88.12.31/datasink/12, Jobqueue:2,' and may control the storage unit 130 to store the prepared lookup table.

If a print status check request for a job ID is received, the controller 160 may notify the CP of a print status of a print job having the job ID. In more detail, the CP may request to check the print status of print data, which is transferred to the image forming apparatus 100, using the job ID received from the image forming apparatus 100. Accordingly, the controller 160 may determine whether the print data corresponding to the job ID is currently printed or is on standby, and may then control the communication interface 110 to notify the CP of the print status associated with the job ID. In this situation, the controller 160 may determine in advance whether the job ID is a job ID created by the image forming apparatus 100. Upon determining that the request job ID is not a job ID created by the image forming apparatus 100, the controller 160 may control the communication interface 110 to send error information to the CP.

If a print cancel command for a job ID is received, the controller 160 may cancel printing of print data corresponding to the job ID. In more detail, if the print cancel command is received from the CP, the controller 160 may check a status of the print data corresponding to the job ID. As a result, if it is determined that the print data is currently printed, the controller 160 may control the image forming unit 140 to suspend printing of the print data, or if it is determined that the print data is on standby, the controller 160 may delete the print data corresponding to the job ID from the job queue.

Additionally, if the received print data is completely printed, the controller 160 may notify that the print job having the received print data is completely performed. In more detail, if the received print data is completely printed, the controller 160 may control the communication interface 110 to notify the CP, which transmits the print data, of completion of printing.

The controller 160 may control the user interface 120 to display the status of the printing operation described above. In more detail, if the print status check request or print cancel command is received from the CPs 20-1, 20-2, . . . , 20-n, or if printing is completed, the controller 160 may control the user interface 120 to display information regarding the print status.

Therefore, the image forming apparatus 100 may create data sink addresses for each print job, and may receive print data at the created data sink addresses. Thus, a correct correspondence between the job ID and the print data may be maintained.

Figure 2:
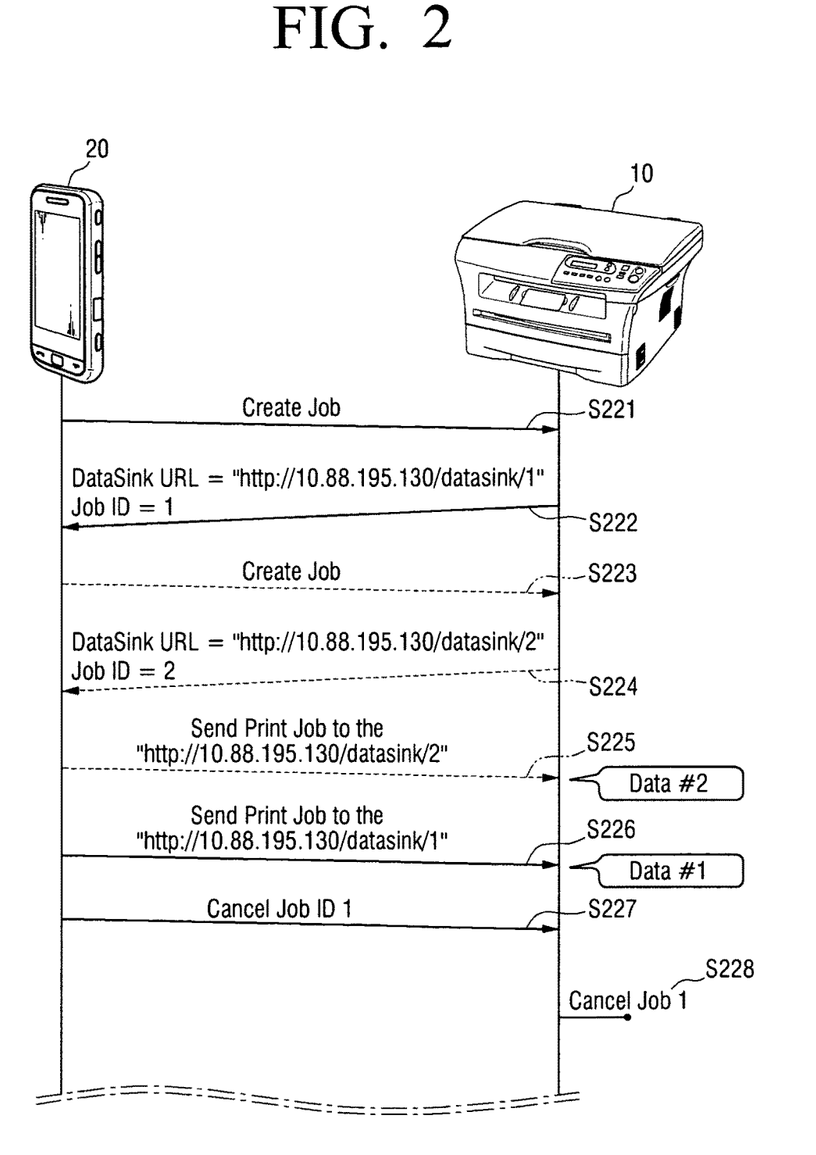
FIG. 2 is a view explaining an operation of the image forming apparatus of FIG. 1 when two print jobs are received from a single CP.

FIG. 2 is a view explaining an operation of the image forming apparatus 100 of FIG. 1 when two print jobs are received from a single CP. In FIG. 2, solid lines represent operations to process a first print job, and dotted lines represent operations to process a second print job.

Referring to FIG. 2, if requests to execute a plurality of print jobs are received from a CP 20 in operations S221 and S223, the image forming apparatus 100 creates different data sink addresses for each of the plurality of print jobs, and transmits the created data sink addresses to the CP 20 in operations S222 and S224. Additionally, the image forming apparatus 100 receives print data at the created data sink addresses from the CP 20 in operations S225 and S226, so as to determine which print job contains the currently received print data. Therefore, the image forming apparatus 100 according to the exemplary embodiment can recognize which print job contains the print data, even when additional information is not received separately during transmission of the print data.

Furthermore, if a command to cancel the first print job is received from the CP 20 in operation S227, the image forming apparatus 100 may cancel the first print job in operation S228. In more detail, even when print data is received in a reverse order to the order in which the print job request is received, the image forming apparatus 100 may correctly cancel a print job requested by the CP 20.

Figure 3:
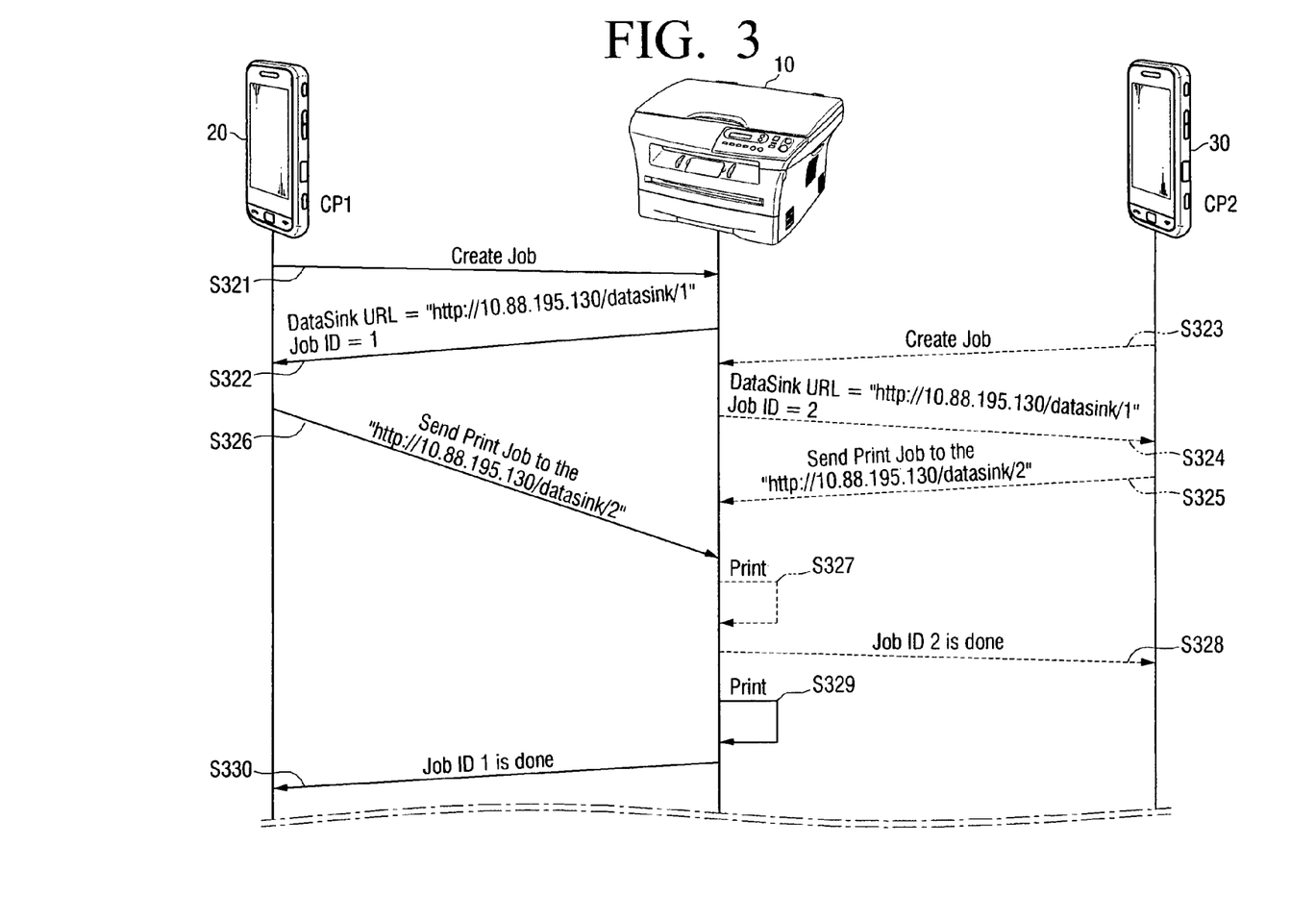
FIG. 3 is a view explaining an operation of the image forming apparatus of FIG. 1 when a print job is received from two CPs.

FIG. 3 is a view explaining an operation of the image forming apparatus 100 of FIG. 1 when a print job is received from two CPs. In FIG. 3, solid lines represent operations to process a first print job, and dotted lines represent operations to process a second print job.

Referring to FIG. 3, if requests to execute print jobs are received from two CPs 20 and 30 in operations S321 and S323, the image forming apparatus 100 creates different data sink addresses for each print job, and transmits the created data sink addresses to the CPs 20 and 30 in operations S322 and S324. Additionally, the image forming apparatus 10 receives print data at the created data sink addresses from the CPs 20 and 30 in operations S325 and S326, so as to exactly know which print job contains the currently received print data and which CP requests the print jobs. Therefore, even when print data is completely printed in an order reverse to the order in which print jobs are completed in operations S327 and S329, the image forming apparatus 100 may exactly notify a CP, which sends the print data, of completion of printing in operations S328 and S330.

Figure 5:
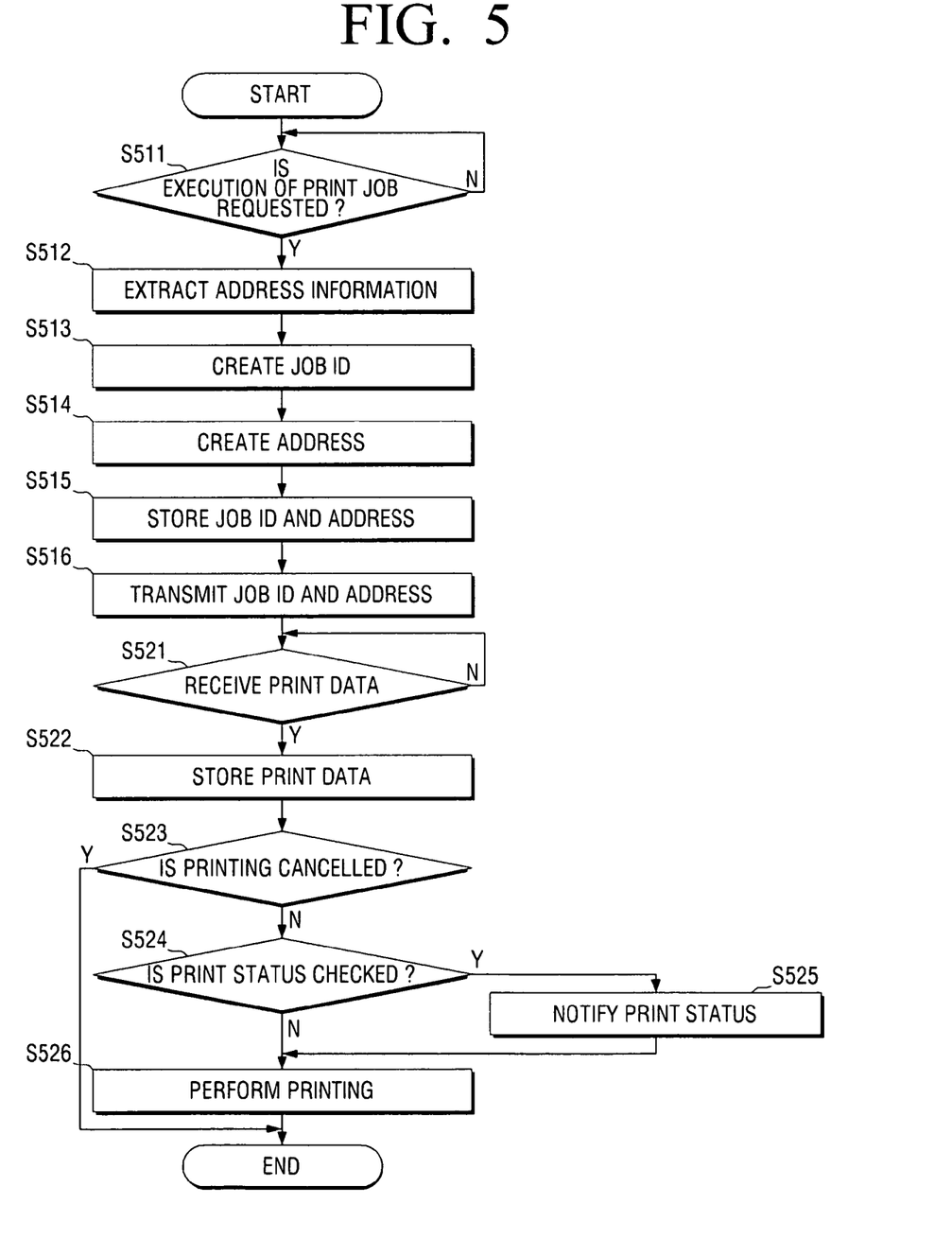
FIG. 5 is a flowchart explaining an image forming method according to an exemplary embodiment.

FIG. 5 is a flowchart explaining an image forming method according to an exemplary embodiment.

In FIG. 5, if a request to execute a print job is received from a CP connected over the DLNA network in operation S511-Y, address information of the CP may be extracted in operation S512. Herein, the address information may be information on an address for a CP which requests execution of a print job, for example an IP address and a MAC address for the CP. The extracting operation may be omitted in manufacturing of products.

Additionally, a job ID of the print job requested to be performed may be created in operation S513. In more detail, if a request to execute a print job is received from a CP, a unique job ID for the print job may be created. For example, the number of times to execute the print job may be counted and a counted value may be used to create a job ID. Alternatively, a job ID may be created based on a point of time at which the print job request is received, or may be created by adding the extracted address information to the counted value or the time.

Subsequently, a data sink address may be created using the created job ID in operation S514. The data sink address may receive print data of a print job, and may include a fixed portion and a variable portion. In more detail, the job ID created in operation S513 may be added to an IP address for the image forming apparatus 100, so that a data sink address may be created. In operation S514, the extracted address information may be combined with the created job ID, so that a 'data sink address at which print data of the print job is to be received' may be created. Herein, the 'data sink address at which print data of the print job is to be received' refers to a 'data sink URL' in the UPnP standard.

The created job ID and the created data sink address may be stored in such a manner that they correspond to each other in operation S515. In more detail, the created job ID and created data sink address for a single job may be stored in the form of a lookup table.

The created job ID and the created data sink address may be transmitted to the CP in operation S516. More specifically, after a job ID and data sink address for a single print job are created, the created job ID and the created data sink address may be transmitted to the CP which requests execution of the print job. In this situation, the created job ID and the created data sink address may be encoded using a pre-stored password, and the encoded job ID and data sink address may then be transmitted to the CP.

Additionally, if print data is received from the CP in operation S521, a job ID corresponding to a data sink address at which the print data is received may be assigned to the received print data, and the received print data may be printed in operation S526. In more detail, the CP may transmit print data to the created data sink address corresponding to the print job, and thus the print data received at the created data sink address may be recognized as the print data of the job corresponding to the data sink address. In this situation, whether there is a job ID corresponding to the data sink address at which print data is received may be determined in advance, while a pre-stored lookup table is monitored. If it is determined that there is no job ID, an error message may be provided to a CP which transmits the print data to the data sink address.

The received print data may be stored as print data of the print job having the job ID corresponding to the data sink address in operation S522. For example, if a job ID and a data sink address which are provided to the CP are '12,' and 'http://10.88.12.31/datasink/12,' respectively, print data received at 'http://10.88.12.31/datasink/12' may be recognized as print data corresponding to job ID 12. Additionally, if print data is sequentially stored in a job queue, and if corresponding print data is stored in a second region, a lookup table such as 'Job ID: 12, DataSink URL: http://10.88.12.31/datasink/12, Jobqueue:2' may be stored.

If a print status check request for a job ID is received during printing in operation S524, the print status for the job ID may be notified in operation S525. In more detail, whether the print data corresponding to the job ID is currently printed or is on standby may be determined, and then the print status associated with the job ID may be notified to the CP. In this situation, the print status may be displayed on the user interface 120, so a user can check the print status.

If a print cancel command for a job ID is received during printing in operation S523, printing of print data corresponding to the job ID may be cancelled. In more detail, if the print cancel command is received from the CP, a status of the print data corresponding to the job ID may be checked. As a result, if it is determined that the print data is currently printed, printing of the print data may be suspended, or if it is determined that the print data is on standby, the print data corresponding to the job ID may be deleted from the job queue. In this situation, a message to notify a user that the print job is cancelled may be displayed on the user interface 120.

Additionally, if the received print data is completely printed, completion of the print job having the received print data may be notified. In more detail, if the received print data is completely printed, the CP, which transmits the print data, may be provided with notification of completion of printing. In this situation, a message to notify a user of the completion of printing may be displayed on the user interface 120.

As described above, in the image forming method according to the exemplary embodiment, print data may be received at a unique data sink address corresponding to a print job, so it is possible to distinguish print data and to easily manage and control print data. The image forming method of FIG. 5 may be performed on the image forming apparatus 100 configured as shown in FIG. 1, or may be performed on image forming apparatuses having configurations other than that shown in FIG. 1.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. An image forming apparatus, which is connected to a network and performing a print job, comprising:
    an image forming unit to output print data;
    a stack to create a job identification (ID) of a print job requested to be executed in response to a print job execution request received from a control point (CP) connected over the network, and to create a data sink address corresponding to the created job ID by adding the created job ID to an IP address for the image forming apparatus;
    a communication interface to transmit the created job ID and the created data sink address to the CP, and to receive the print data corresponding to the data sink address from the CP; and
    a controller to assign the job ID to the received print data and to control the image forming unit to print the print data,
    wherein the data sink address comprises a fixed portion and variable portion to receive print data of the print job.

2. The image forming apparatus according to claim 1, wherein the stack comprises an extraction unit to extract address information of the CP.

3. The image forming apparatus according to claim 1, wherein the fixed portion of the data sink address includes an address for the image forming apparatus, and the variable portion includes the job ID or information specific to the CP.

4. The image forming apparatus according to claim 3, wherein the information specific to the CP is at least one of an IP address, a media access control (MAC) address of the CP or a combination thereof.

5. The image forming apparatus according to claim 1, further comprising:
    a storage unit to store the job ID of the print job and the data sink address, wherein, when the print data is received, the controller compares the job ID and the data sink address which are stored in the storage unit, and assigns a job ID to the received print data.

6. The image forming apparatus according to claim 1, wherein, when a print status check request for the job ID is received from the CP, the controller notifies the CP of a print status of the print job having the job ID.

7. The image forming apparatus according to claim 1, wherein, when a print cancel command for the job ID is received from the CP, the controller cancels printing of the print data of the print job having the job ID and notifies the CP of cancellation of the print job.

8. The image forming apparatus according to claim 1, wherein, when the print data output from the CP is completely printed, the controller notifies the CP of completion of printing.

9. The image forming apparatus according to claim 6, further comprising: a user interface to display the print status.

10. The image forming apparatus according to claim 1, wherein the communication interface encodes the created job ID and the created data sink address using a preset password, and transmits the encoded job ID and encoded data sink address.

11. The image forming apparatus according to claim 1, wherein the stack comprises:
    a job ID creator to create a unique job ID for the print job; and
    an address creator to create a unique variable portion of the data sink address according to the print job.

12. An image forming method of an image forming apparatus, which is connected to a network and performing a print job, the image forming method comprising:

receiving a print job execution request from a control point (CP) connected over the network;

creating a job identification (ID) of a print job in response to the received print job execution request;

creating a data sink address corresponding to the created job ID by adding the created job ID to an IP address for the image forming apparatus;

transmitting the created job ID and the created data sink address to the CP;

when print data corresponding to the data sink address is received from the CP, assigning the job ID to the received print data; and printing the print data, wherein the data sink address comprises a fixed portion and a variable portion to receive print data of the print job.

13. The image forming method according to claim 12, further comprising:

extracting address information of the CP.

14. The image forming method according to claim 12, wherein the creating the data sink address comprises creating the fixed portion including a fixed address for the image forming apparatus, and the variable portion including the job ID and information specific to the CP.

15. The image forming method according to claim 14, wherein the unique information of the CP is at least one of an IP address, a media access control (MAC) address of the CP or a combination thereof.

16. The image forming method according to claim 12, further comprising:

storing the job ID and the data sink address, wherein the assigning of the job ID comprises, when the print data is received, comparing the stored job ID and the stored data sink address and assigning the job ID to the received print data.

17. The image forming method according to claim 12, further comprising:

when a print status check request for the job ID is received from the CP, notifying the CP of a print status of the print job having the job ID.

18. The image forming method according to claim 12, further comprising:

when a print cancel command for the job ID is received from the CP, cancelling printing of the print data of the print job having the job ID; and notifying the CP of cancellation of the print job.

19. The image forming method according to claim 12, further comprising:

when the print data is completely printed, notifying the CP of completion of printing.

20. The image forming method according to claim 17, further comprising:

displaying the print status on a user interface of the image forming apparatus.

21. The image forming method according to claim 12, wherein the transmitting of the created job ID and the created data sink address comprises encoding the created job ID and the created data sink address using a preset password, and transmitting the encoded job ID and encoded data sink address.

22. The image forming method according to claim 12, wherein the creating of the job ID comprises creating a job ID specific to the print job, and the creating of the data sink address comprises creating a data sink address having a variable portion specific to the print job.

23. An image forming method, comprising:

requesting a print job from a control point (CP);

creating a unique data sink address for the print job, comprising creating a job ID or using information specific to the CP; and sending print data to the unique data sink address.

24. The image forming method according to claim 23, wherein the using the information specific to the CP comprises using at least one of an IP address, a media access control address, or a combination thereof.

25. The image forming apparatus according to claim 1, wherein the network is a digital living network alliance (DLNA) network.

26. The image forming apparatus according to claim 12, wherein the network is a digital living network alliance (DLNA) network.

27. The image forming apparatus according to claim 1, wherein the stack is a digital living network alliance (DLNA) stack.

* * * * *